(12) United States Patent
An

(10) Patent No.: US 10,529,330 B2
(45) Date of Patent: Jan. 7, 2020

(54) SPEECH RECOGNITION APPARATUS AND SYSTEM

(71) Applicant: SORIZAVA CO., LTD., Seoul (KR)

(72) Inventor: Munhak An, Seoul (KR)

(73) Assignee: SORIZAVA CO., LTD., Seoul (KR)

( * ) Notice: Subject to any disclaimer, the term of this patent is extended or adjusted under 35 U.S.C. 154(b) by 0 days.

(21) Appl. No.: 15/821,953

(22) Filed: Nov. 24, 2017

(65) Prior Publication Data

US 2019/0164543 A1    May 30, 2019

(51) Int. Cl.

| | |
|---|---|
| *G10L 15/00* | (2013.01) |
| *G10L 15/22* | (2006.01) |
| *G06F 3/16* | (2006.01) |
| *G06F 3/0481* | (2013.01) |
| *G10L 15/30* | (2013.01) |
| *G10L 15/26* | (2006.01) |
| *G06F 3/0482* | (2013.01) |
| *G06F 17/21* | (2006.01) |

(52) U.S. Cl.
CPC ............ *G10L 15/22* (2013.01); *G06F 3/0482* (2013.01); *G06F 3/04812* (2013.01); *G06F 3/167* (2013.01); *G06F 17/214* (2013.01); *G10L 15/265* (2013.01); *G10L 15/30* (2013.01); *G06F 17/211* (2013.01)

(58) Field of Classification Search
USPC ................... 704/231–257, 270–275
See application file for complete search history.

(56) References Cited

U.S. PATENT DOCUMENTS

| | | | | |
|---|---|---|---|---|
| 5,386,494 | A * | 1/1995 | White ..................... | G06F 3/167 704/231 |
| 6,839,669 | B1* | 1/2005 | Gould ..................... | G10L 15/22 704/246 |
| 2002/0095291 | A1* | 7/2002 | Sumner ................... | G10L 15/22 704/270 |
| 2009/0125299 | A1* | 5/2009 | Wang ...................... | G10L 15/22 704/201 |
| 2013/0166304 | A1* | 6/2013 | Gschwendtner ........ | G10L 15/22 704/260 |

FOREIGN PATENT DOCUMENTS

KR    10-1154011 B1    6/2012

* cited by examiner

*Primary Examiner* — Jesse S Pullias
(74) *Attorney, Agent, or Firm* — Hauptman Ham, LLP

(57) ABSTRACT

The present invention relates to a speech recognition apparatus and system for recognizing speech and converting the speech into text, and displaying an input state thereof in real-time for correction. In the speech recognition apparatus, speech input from a speech input unit is converted into text in units of words to display the converted text in real time on a first display window, and words displayed on the first display window are combined to generate a sentence such that the generated sentence is displayed on a second display window in real time. Therefore, a process through which what kind of sentence is formed by a combination of what kind of words may be intuitively confirmed so that text generated through speech recognition may be easily corrected.

11 Claims, 6 Drawing Sheets

SPEECH RECOGNITION APPARATUS AND SYSTEM

TECHNICAL FIELD

The present invention relates to a speech recognition apparatus, and more particularly, to a speech recognition apparatus and system capable of recognizing speech, converting the speech into text, and displaying an input state of the text in real-time for correction.

BACKGROUND

Recently, speech recognition technology has been popularized in smart phones, and speech recognition is expected to be used as the most important character input means in wearable devices such as smart watches.

In speech recognition technology, when speech recognition is performed on a speech input, the speech input is recognized in units of words, the recognized words are combined to form a sentence, and the sentence is displayed to a user in a text form.

However, although the speech recognition technology has been developed for a long time, there are still many errors when accurately replacing input speech with text through speech recognition.

Accordingly, when recognized text is different from an intention or has an error, the recognized text needs to be corrected.

Generally, in order to correct text, the text is corrected by deleting part of the text in units of characters via a backspace key using a keyboard, or a previous error is corrected by deleting the entire text which is input in a speech unit and re-inputting the text by performing speech again.

Such a method of correcting text is accompanied by a troublesome operation such as pressing the backspace key on the keyboard multiple times and deleting the text in units of characters, re-inputting text, and the like.

When text is re-input in a speech unit, a part of the text with no problem in recognition in addition to misrecognized text may be re-input, and the same error may be generated again.

Meanwhile, since a conventional speech recognition apparatus displays sentences finally formed by word combinations in a text form, there is a problem in that a user intended for correction cannot check what kinds of words are combined to form a sentence.

RELATED ART DOCUMENTS

Patent Document (Patent Document 1) Korean Patent No. 10-1154011 (registered on May 31, 2012)

The present invention is directed to providing a speech recognition apparatus and system in which, when speech is input, a process through which what kind of sentence is formed by a combination of what kind of words may be intuitively checked so that text generated through speech recognition may be easily corrected.

One aspect of the present invention provides a speech recognition apparatus including a speech input unit configured to receive speech, a key input unit configured to receive a signal for correcting a word or a sentence converted into text through the speech input from the speech input unit, a display unit including a first display window configured to display words obtained by converting the speech input from the speech input unit into text and a second display window configured to display a sentence obtained by combining the words displayed on the first display window, and a controller configured to convert the speech input from the speech input unit into text in units of words and allow the converted text to be displayed in real time on the first display window, and combine the words displayed on the first display window to generate a sentence and allow the generated sentence to be displayed in real time on the second display window, wherein the controller allows a first cursor, which is displayed at an end of a word displayed in real time on the first display window and indicates an input state of the word, to be displayed on the first display window, allows a second cursor, which is displayed at an end of a combined sentence displayed in real time on the second display window and indicates an input state of the sentence, to be displayed on the second display window, and allows a third cursor for correction according to a signal of the key input unit to be moved and displayed on the first display window or the second display window, and the controller displays as many special characters as the number of characters of a word that cannot be recognized among the words displayed on the first display window or the second display window to identify the number of characters.

The controller may display a word having a recognition rate lower than a preset value among the words displayed on the first display window or the second display window to identify the word.

The controller may display a value of the recognition rate of the word having the recognition rate lower than the preset value among the words displayed on the first display window or the second display window next to the word having the recognition rate lower than the preset value.

The value of the recognition rate may refer to a value expressed from 0 to 1 according to the recognition rate.

The controller may display a word having a recognition rate lower than a preset value among the words displayed on the first display window or the second display window in a different color or size.

The speech recognition apparatus may further include a storage configured to store foreign language words, wherein, when foreign language speech is input from the speech input unit, the controller may convert the foreign language speech into matched foreign language words among the foreign language words stored in the storage and display the matched foreign language words on the first display window or the second display window.

When the foreign language speech is input from the speech input unit, the controller may phonetically display the foreign language speech, and when the third cursor is moved to a phonetically displayed word by the key input unit, the controller may provide a selection window for selecting at least one matched foreign language word from the foreign language words stored in the storage to the first display window or the second display window.

The controller may combine words displayed on the first display window to generate a sentence, and display the generated sentence on the second display window over time.

The controller may display a recognition rate of a sentence, which is displayed over time, on the second display window.

The display unit may further include a third display window configured to integrate and display sentences which are displayed on the second display window over time.

Another aspect of the present invention provides a speech recognition system including a content providing server configured to provide content including speech, and a speech recognition apparatus including a speech input unit configured to receive the content from the content providing server and receive the speech included in the content, a key input unit configured to receive a signal for correcting a word or a sentence converted into text through the speech input from the speech input unit, a display unit including a first display window configured to display words obtained by converting the speech input from the speech input unit into text and a second display window configured to display a sentence obtained by combining the words displayed on the first display window, and a controller configured to convert the speech input from the speech input unit into text in units of words and allow the converted text to be displayed in real time on the first display window, and combine the words displayed on the first display window to generate a sentence and allow the generated sentence to be displayed in real time on the second display window, wherein the controller allows a first cursor, which is displayed at an end of a word displayed in real time on the first display window and indicates an input state of the word, to be displayed on the first display window, allows a second cursor, which is displayed at an end of a combined sentence displayed in real time on the second display window and indicates an input state of the sentence, to be displayed on the second display window, and allows a third cursor for correction according to a signal of the key input unit to be moved and displayed on the first display window or the second display window, and the controller displays as many special characters as the number of characters of a word that cannot be recognized among the words displayed on the first display window or the second display window to identify the number of characters.

According to the present invention, in a speech recognition apparatus, speech input from a speech input unit is converted into text in units of words to display the converted text in real time on a first display window, and words displayed on the first display window are combined to generate a sentence such that the generated sentence is displayed on a second display window in real time. Therefore, a process through which what kind of sentence is formed by a combination of what kind of words can be intuitively checked so that text generated by speech recognition can be easily corrected.

According to the present invention, in the speech recognition apparatus, a word having a low recognition rate among words which are recognized and displayed through speech recognition may be displayed and identified so that the text recognized and generated through speech recognition can be easily corrected.

According to the present invention, in the speech recognition apparatus, a word which cannot be recognized among words which are recognized and displayed through speech recognition may be displayed to identify the number of the character so that the text recognized and generated through speech recognition can be easily corrected.

According to the present invention, in the speech recognition apparatus, when foreign language speech is input, the foreign language speech is converted into matched foreign language words among foreign language words stored in a storage to display the matched foreign language words so that each of the foreign language words can be converted even when text is not corrected after deletion.

DETAILED DESCRIPTION

In the following description, detailed descriptions of well-known functions or constructions will be omitted since they would obscure the invention with unnecessary detail.

It should be understood that the terms used in the specification and the appended claims are not to be construed as limited to general and dictionary meanings, but are to be interpreted on the basis of the meanings and concepts corresponding to technical aspects of the present invention on the basis of the principle that the inventor is allowed to define terms appropriately for the best explanation. Therefore, the description proposed herein is simply a preferable example for the purpose of illustrations only and is not intended to limit the scope of the invention, and thus it should be understood that other equivalents and modifications may be made thereto without departing from the spirit and scope of the invention.

Hereinafter, exemplary embodiments of the present invention will be described in detail with reference to the accompanying drawings.

Figure 1:
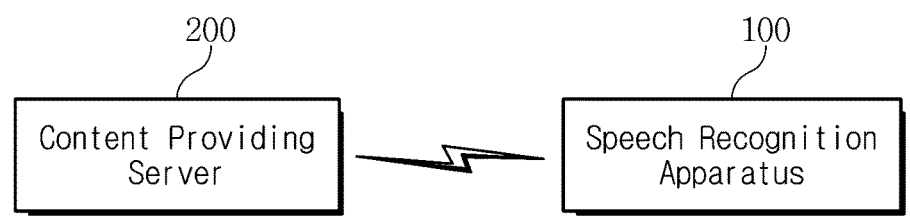
FIG. 1 is a block diagram illustrating a configuration of a speech recognition system according to an embodiment of the present invention.

FIG. 1 is a block diagram illustrating a configuration of a speech recognition system according to an embodiment of the present invention.

Referring to FIG. 1, a speech recognition system 300 according to the embodiment of the present invention includes a content providing server 200 and a speech recognition apparatus 100.

The content providing server 200 may provide an audio or video file including speech to the speech recognition apparatus 100. For example, the content providing server 200 may be a server of a broadcaster, a server of a national assembly, or the like. Here, the content providing server 200 may transmit an audio or video file to the speech recognition apparatus 100. The speech recognition apparatus 100 may convert speech included in the audio file or the video file into text, and transmit the converted text to the content providing server 200. The content providing server 200 may use the text received from the speech recognition apparatus 100 as subtitles.

The speech recognition apparatus 100 receives the audio or video file including speech from the content providing server 200. The speech recognition apparatus 100 recognizes the speech included in the audio or video file received from the content providing server 200 and converts the speech into a text form.

When speech is input to the speech recognition apparatus 100, the speech recognition apparatus 100 extracts feature vectors necessary for recognition from the speech. Here, the feature vectors represent well phonetic characteristics and are set to be insensitive to other factors, such as background noise, a difference between speakers, a phonetic attitude, and the like. Then, the speech recognition apparatus 100 performs a pattern classification process in which possible words are extracted by comparing the feature vectors with a stored word model, that is, a phonetic characteristic of each word or an acoustic model in units of phonemes shorter than the phonetic characteristic. Here, the speech recognition apparatus 100 may display a word having the highest recognition rate obtained by performing the pattern classification process on a specific window on a screen.

Further, the speech recognition apparatus 100 performs a sentence-based search on the result obtained by performing the pattern classification process in the form of a series of candidate words or candidate phonemes. Here, the speech recognition apparatus 100 determines a grammar structure, an entire sentence context, or whether the result meets a specific topic on the basis of information of candidate words or candidate phonemes, and thus determines which word or phoneme is most appropriate. The speech recognition apparatus 100 may display a sentence which is completed through such a process on a specific window on the screen.

That is, the speech recognition apparatus 100 according to the embodiment of the present invention may display words and sentences, which are obtained through the above process, in real time on individual windows.

Further, the speech recognition apparatus 100 may receive a key input operation from a user and allow the user to correct the words and sentences which are displayed in real time in the independent windows. The speech recognition apparatus 100 may store the corrected and completed speech recognition result or provide the results thereof to the content providing server 200.

Hereinafter, the speech recognition apparatus 100 according to the embodiment of the present invention will be described in more detail.

Figure 2:
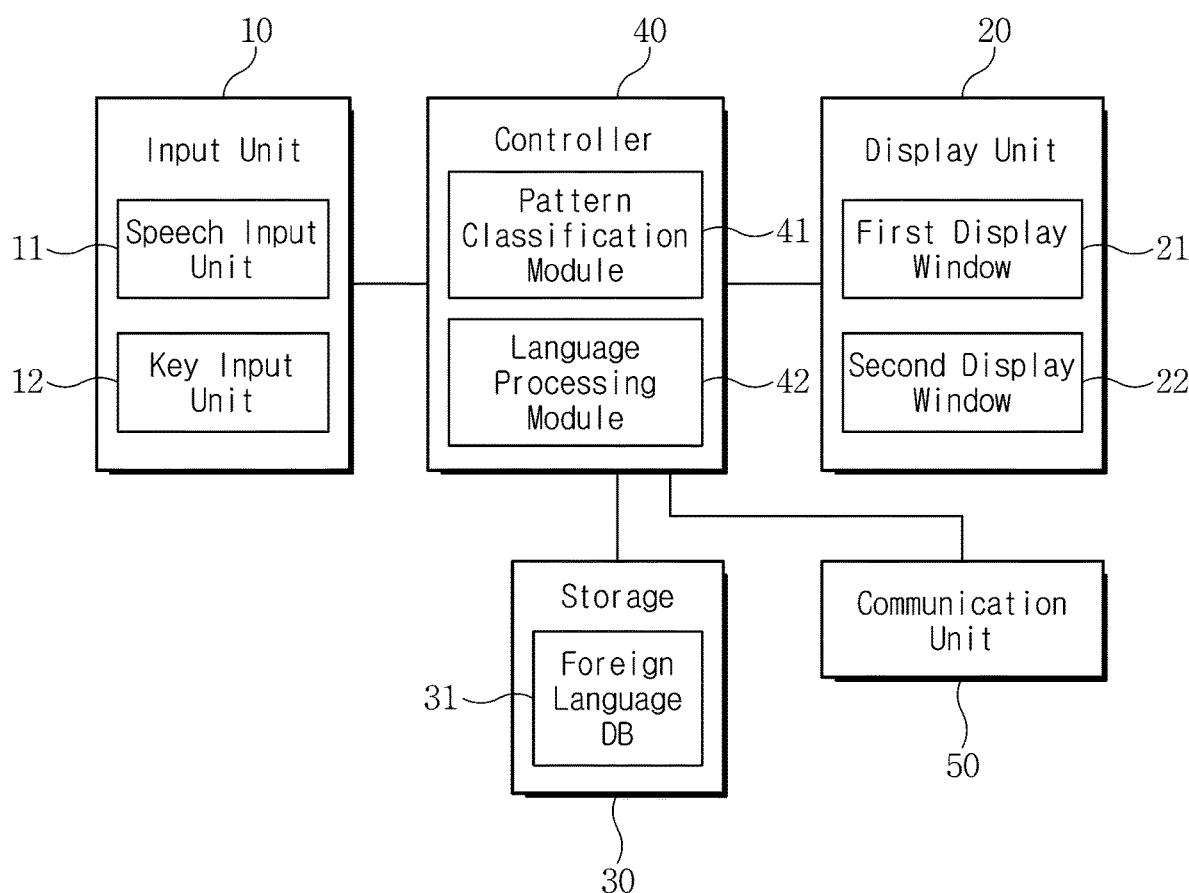
FIG. 2 is a block diagram illustrating a configuration of a speech recognition apparatus according to an embodiment of the present invention.
Figure 3:
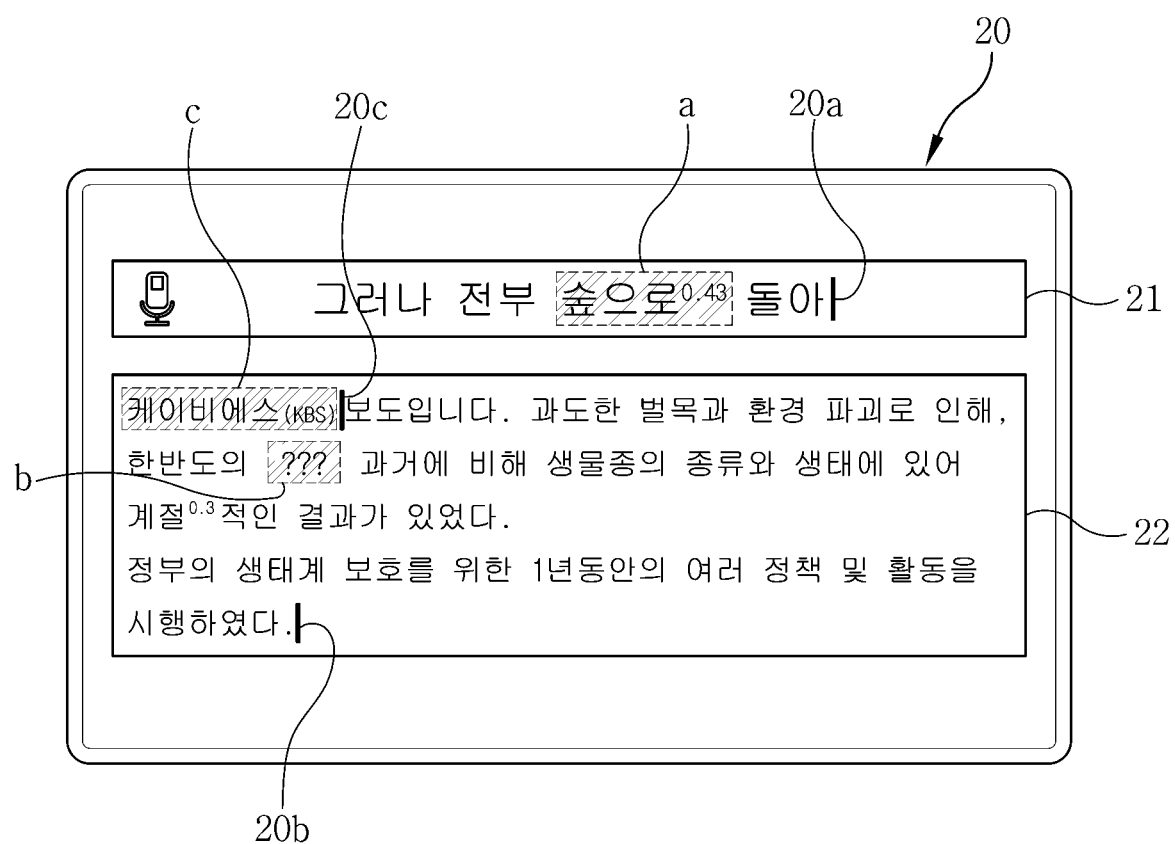
FIG. 3 is a diagram illustrating an exemplary display unit of the speech recognition apparatus according to an embodiment of the present invention.

FIG. 2 is a block diagram illustrating a configuration of the speech recognition apparatus according to an embodiment of the present invention, and FIG. 3 is a diagram illustrating an exemplary display unit of the speech recognition apparatus according to the embodiment of the present invention.

Referring to FIGS. 1 to 3, the speech recognition apparatus 100 according to the embodiment of the present invention includes a communication unit 50, an input unit 10, a display unit 20, a storage 30, and a controller 40.

The communication unit 50 may receive an audio file or a video file from the content providing server 200. The communication unit 50 may receive the audio file or the video file from the content providing server 200 through wired and wireless communication, or transmit text on which speech recognition is completed to the content providing server 200.

The input unit 10 may include a speech input unit 11 and a key input unit 12.

When the speech input unit 11 receives the audio file or the video file from the content providing server 200, the speech input unit 11 may receive speech included in the audio file or the video file. Further, the speech input unit 11 may be configured as a microphone and may receive speech of a user.

The key input unit 12 receives various pieces of information such as number information, character information, and the like, and transmits signals, which are input in relation to settings of various functions and control functions of the speech recognition apparatus 100, to the controller 40. Further, the key input unit 12 may receive a signal for correcting text which is displayed through speech recognition on the display unit 20 by moving a third cursor 30c. For example, the key input unit 12 may be an input device, such as a keyboard, a keypad, a mouse, a joystick, or the like, and may preferably be a shorthand keyboard capable of rapidly correcting misrecognized words or sentences.

The display unit 20 displays information on a series of operation states, operation results, and the like which are generated while the functions of the speech recognition apparatus 100 are performed. Further, the display unit 20 may display a menu of the speech recognition apparatus 100, user data input by the user, and the like. Here, the display unit 20 may include a liquid crystal display (LCD), a thin film transistor LCD (TFT-LCD), a light-emitting diode (LED), an organic LED (OLED), an active matrix OLED (AMOLED), a Retina Display, a flexible display, a three-dimensional display, and the like.

The display unit 20 may include a first display window 21 and a second display window 22.

The first display window 21 displays a result obtained by comparing a feature vector extracted from speech which is input to the speech input unit 11 with a pre-stored word model. That is, the first display window 21 may display a result of pattern classification performed by the controller 40 in real time on a screen. The first display window 21 accumulatively displays words which are results obtained through pattern classification. When a pre-set cumulative range is exceeded, the exceeded words are deleted and new words are additionally displayed in real time on the first display window 21. That is, the first display window 21 may display a recognition state in units of words, which is a precedence step for making a sentence in a speech recognition process. Here, the first display window 21 may display a first cursor 20a for displaying a real-time input state of a word displayed through pattern classification at an end of the word.

A sentence-based search may be performed on a result obtained by a pattern classification process being performed on input speech in the form of a series of candidate words or candidate phonemes, and the second display window 22 may display a grammar structure, an entire sentence context, or whether the result meets a specific topic, that is, a sentence, on the basis of information of the candidate words or the candidate phonemes on a screen. The second display window 22 may display a sentence formed by combining the words in real time. Here, the second display window 22 may display a second cursor 20b for displaying a real-time input state of the sentence formed by the combination of the words at an end of the sentence. Further, the second display window 22 may display the third cursor 20c which moves for correction of the sentence.

The storage 30 stores application programs required for functional operations of the speech recognition apparatus 100. Here, when each function of the speech recognition apparatus 100 is activated corresponding to a request of a user, the storage 30 executes a corresponding application program under control of the controller 40 and provides each of the functions. Here, the storage 30 stores a word model used for pattern classification, that is, a phonetic characteristic of each word or an acoustic model in units of phonemes. Also, the storage 30 stores grammar structure information, sentence context information, specific topic information, and the like. The storage 30 may store a foreign language database (DB) 31. That is, when foreign language speech is input through the speech input unit 11, the storage 30 may store foreign language words that match therewith and provide the matched foreign language words under the control of the controller 40.

When speech is input from the speech input unit 11, the controller 40 may allow words obtained by performing pattern classification thereon to be displayed on the first display window 21 and allow a sentence, in which the words obtained by the pattern classification being performed are combined, to be displayed on the second display window 22.

The controller 40 includes a pattern classification module 41 and a language processing module 42.

The pattern classification module 41 extracts necessary feature vectors from the speech input through the speech input unit 11. Here, the feature vectors represent phonetic characteristics and are set to be insensitive to other factors, such as background noise, a difference between speakers, a phonetic attitude, and the like. Then, the pattern classification module 41 extracts possible words by comparing the feature vectors with a word model stored in the storage 30, that is, a phonetic characteristic of each word or an acoustic model in units of phonemes shorter than the phonetic characteristic. That is, the pattern classification module 41 selects appropriate candidate words by performing a pattern comparison with the acoustic model stored in the storage 30. The pattern classification module 41 allows a word having the highest recognition rate among the selected candidate words to be displayed on the first display window 21. Here, the pattern classification module 41 allows the first cursor 20a, which is displayed at the end of the word displayed in real time on the first display window 21 and indicates an input state of the word, to be displayed on the first display window 21.

Further, the pattern classification module 41 may display a word having a recognition rate lower than a preset value among words, which are displayed on the first display window 21 through the pattern classification process, to be identified. That is, the pattern classification module 41 may display a value of the recognition rate with respect to the word having a recognition rate lower than the preset value among the words displayed on the first display window 21 next to the word. Here, the value of the recognition rate refers to a value expressed from 0 to 1 according to the recognition rate. For example, the pattern classification module 41 may display the value of the recognition rate with respect to a word having a recognition rate value less than 0.8. For example, when the word "수포로" is input from the speech input unit 11, the pattern classification module 41 may misrecognize the word when a recognition rate thereof is low, and may display the word "숲으로," as shown by a symbol a of FIG. 3. In this case, the pattern classification module 41 may display the recognition rate next to the word, as shown by the symbol a.

Figure 7:
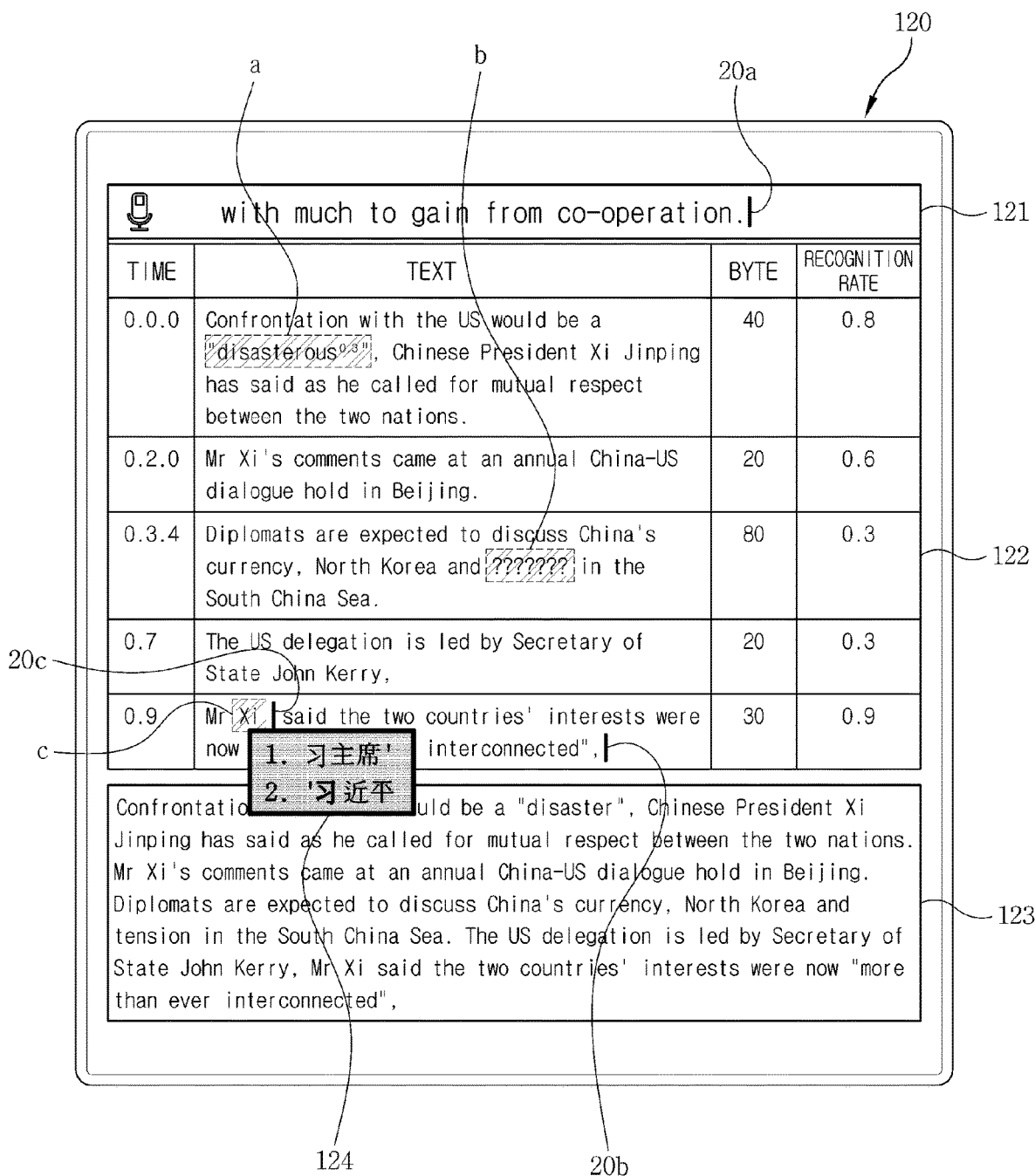

For example, when the word "disaster" is input from the speech input unit 11, the pattern classification module 41 may misrecognize the word when a recognition rate thereof is low, and may display the word "disasterous," as shown by a symbol a of FIG. 7. In this case, the pattern classification module 41 may display the recognition rate next to the word, as shown by the symbol a. Further, the pattern classification module 41 may display the word having a recognition rate value lower than the preset value in a different color or size.

As described above, in the speech recognition apparatus 100 according to the present invention, a word having a low recognition rate among words which are recognized and displayed through speech recognition by the pattern classification module 41 may be displayed to be identified so that text recognized and generated through speech recognition may be easily corrected.

Further, the pattern classification module 41 may display a word which cannot be recognized such that the number of characters of the word may be identified. That is, the pattern classification module 41 may display as many special characters as the number of characters of the word which cannot be recognized. For example, when the word "상황은" is spoken to be input but is not recognized, the pattern classification module 41 may display "???" such that the number of characters of the word may be identified, as shown by a symbol b of FIG. 3.

For example, when the word "tension" is spoken to be input but is not recognized, the pattern classification module 41 may display "???????" such that the number of characters of the word may be identified, as shown by a symbol b of FIG. 7.

As described above, in the speech recognition apparatus 100 according to the present invention, a word which cannot be recognized among words which are recognized and displayed through speech recognition by the pattern classification module 41 may be displayed to identify the number of the characters so that the text recognized and generated through speech recognition may be easily corrected.

Further, when foreign language speech is input from the speech input unit 11, the pattern classification module 41 may convert the foreign language speech into matched foreign language words among foreign language words stored in the storage 30 and display the matched foreign language words on the first display window 21 or the second display window 22. For example, the pattern classification module 41 may display the matched foreign language words next to a phonetically displayed word, as shown by a symbol c of FIG. 3.

The language processing module 42 performs a sentence-based search on a result obtained by performing the pattern classification process in the pattern classification module 41 in the form of a series of candidate words or candidate phonemes. Here, the language processing module 42 determines a grammar structure, an entire sentence context, or whether the result meets a specific topic on the basis of information of candidate words or candidate phonemes, and thus determines which word or phoneme is most appropriate. Then, the language processing module 42 generates a sentence by mixing the most appropriate words. Here, the language processing module 42 may display the generated sentence in real time on the second display window 22.

Here, the language processing module 42 may allow the second cursor 20b for displaying a real-time input state of the sentence formed by the combination of the words on the second display window 22 to be displayed at an end of the sentence. Further, the language processing module 42 may display the third cursor 20c which moves for correction of the sentence on the second display window 22. Here, the third cursor 20c may be moved according to an input of the key input unit 12.

Further, like the pattern classification module 41, the language processing module 42 may display a word having a low recognition rate to be identified, display a word which cannot be recognized such that the number of characters of the word can be identified, and convert a foreign language word into a matched foreign language word stored in the storage 30 to display the matched foreign language word on the second display window 22. Meanwhile, since functions with respect to a word having a low recognition rate, a word which cannot be recognized, and a foreign language word are the same as those of the above-described pattern classification module 41, identical descriptions thereof will be omitted.

Figure 4:
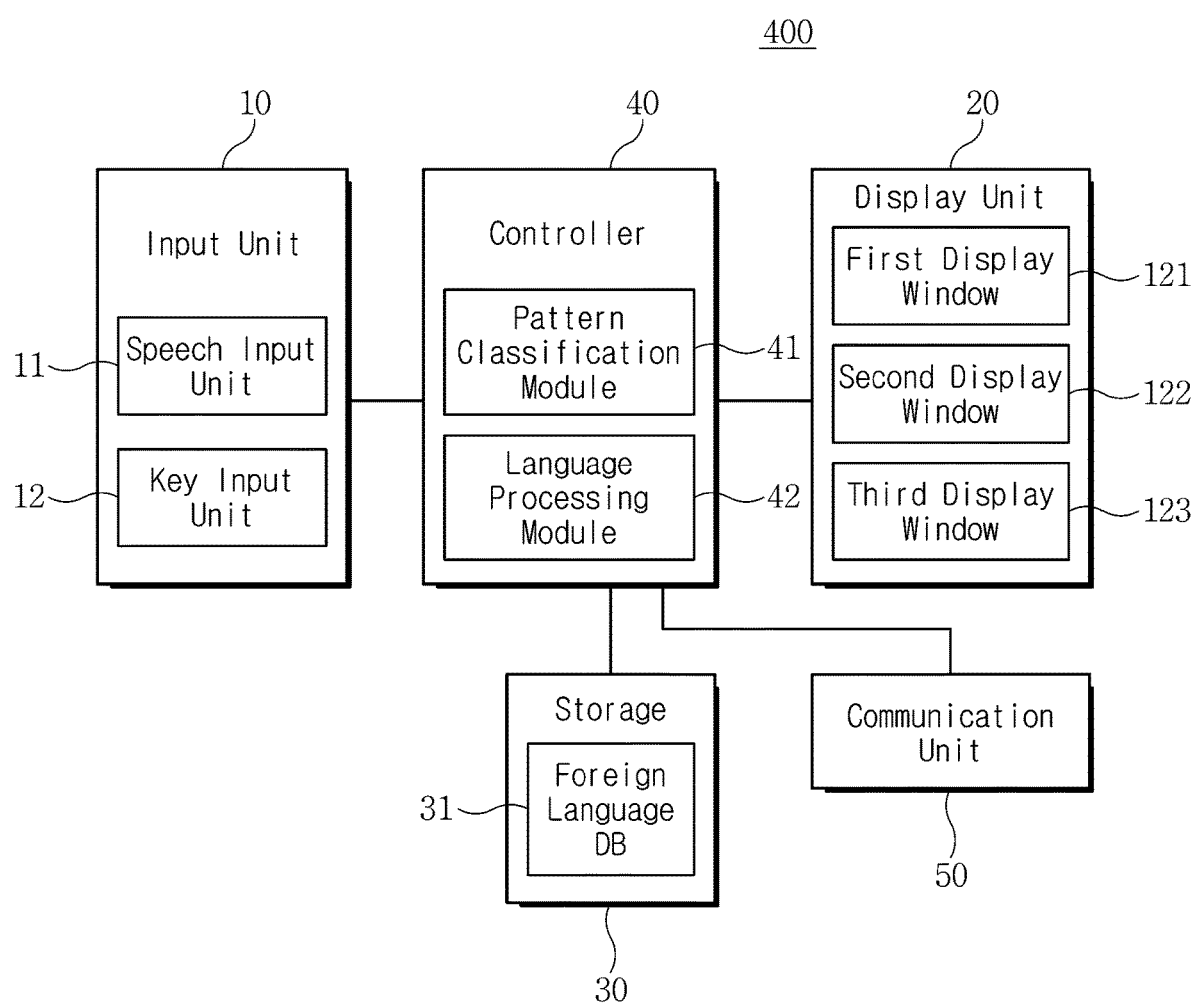
FIG. 4 is a block diagram illustrating a configuration of a speech recognition apparatus according to another embodiment of the present invention.
Figure 5:
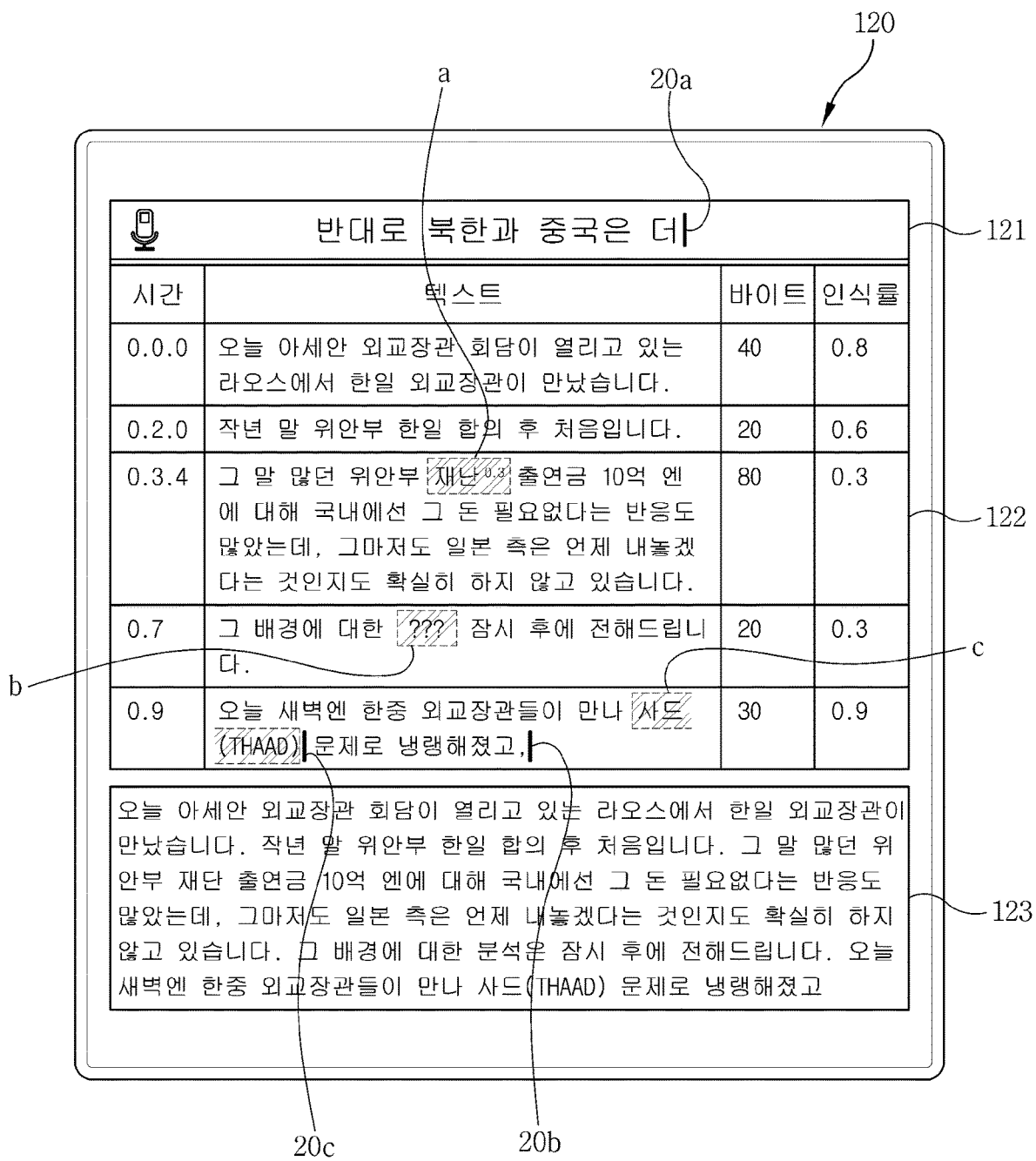
FIGS. 5 to 7 are diagrams illustrating an exemplary display unit of the speech recognition apparatus according to another embodiment of the present invention.
Figure 6:
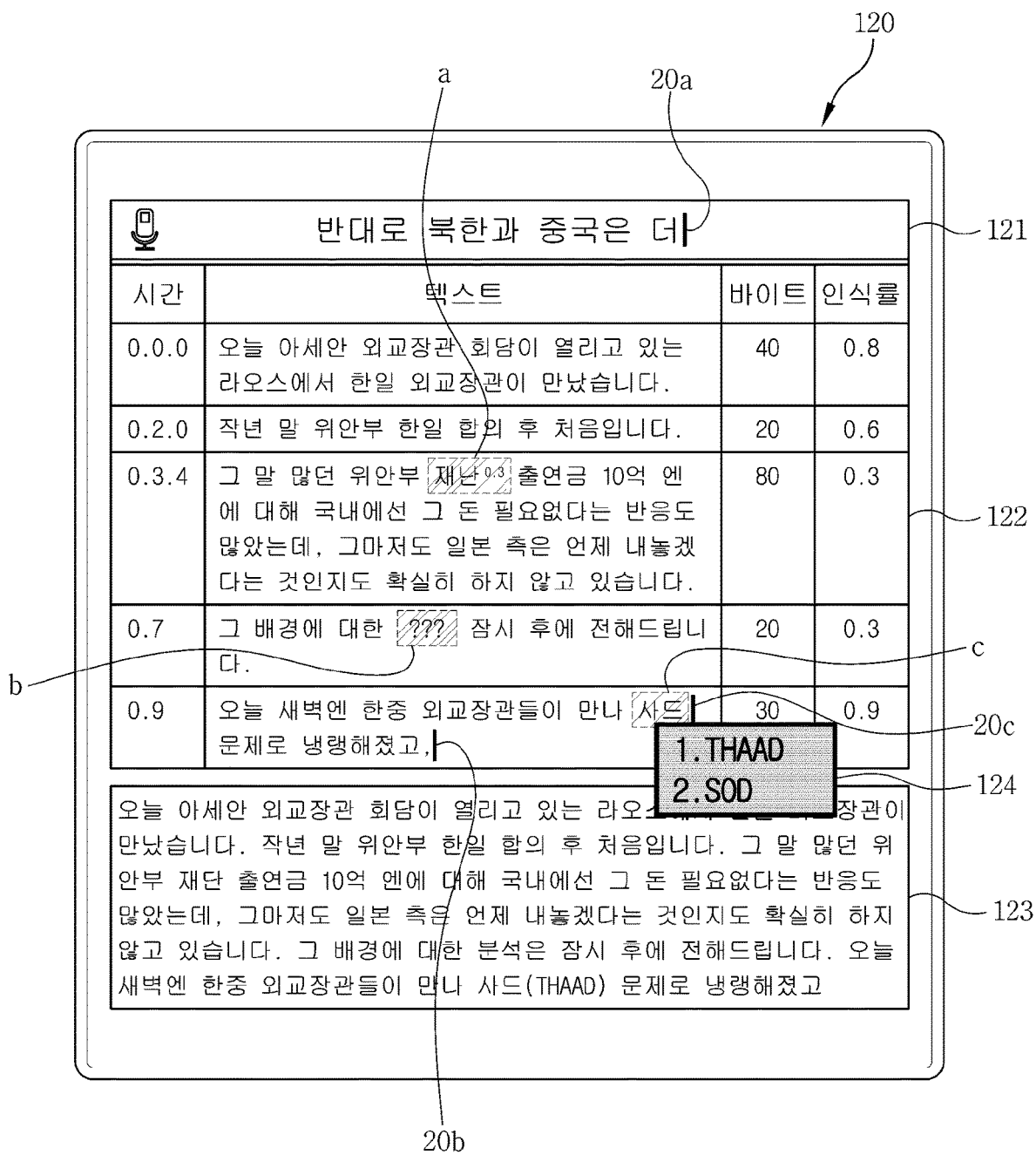

Hereinafter, a speech recognition apparatus according to another embodiment of the present invention will be described FIG. 4 is a block diagram illustrating a configuration of a speech recognition apparatus according to another embodiment of the present invention, and FIGS. 5 and 6 are diagrams illustrating an exemplary display unit of the speech recognition apparatus according to another embodiment of the present invention.

Meanwhile, referring to FIGS. 4 to 6, a speech recognition apparatus 400 according to another embodiment of the present invention has substantially the same configuration as the speech recognition apparatus 100 according to the embodiment of the present invention described above except a configuration of a display unit 120. Therefore, descriptions of the same configurations will be omitted, and the same reference numerals will be given to the same configurations.

The display unit 120 of the speech recognition apparatus 400 according to another embodiment of the present invention may include a first display window 121 and a second display window 122, and may further include a third display window 123 which displays a sentence completed in the second display window 122.

The first display window 121 displays a result obtained by comparing a feature vector extracted from speech which is input to the speech input unit 11 with a pre-stored word model. That is, the first display window 121 may display a result of pattern classification performed by the controller 40 in real time on a screen. The first display window 121 accumulatively displays words which are results obtained through pattern classification. When some words exceed a pre-set cumulative range, the words are deleted and new words are additionally displayed in real time on the first display window 121. That is, the first display window 121 may display a recognition state in units of words, which is a precedence step for making a sentence in the speech recognition process. Here, the first display window 121 may display a first cursor 20a for displaying a real-time input state of a word displayed through pattern classification at an end of the word.

A sentence-based search may be performed on a result obtained by performing a pattern classification process on input speech in the form of a series of candidate words or candidate phonemes, and the second display window 122 may display a grammar structure, an entire sentence context, or whether the result meets a specific topic, that is, a sentence, on the basis of information of the candidate words or the candidate phonemes on a screen. The second display window 122 may display a sentence formed by combining the words over time. The second display window 122 may provide various items in the form of a table, and display content corresponding to the items. For example, the second display window 122 may display time, text, the number of bytes, or a recognition rate. Here, the text refers to a sentence formed by the combination of words, and the time may be displayed in accordance with a time of the input speech. The number of bytes refers to a length of a sentence, and the recognition rate refers to a speech recognition rate of the sentence. Here, the second display window 122 may display a second cursor 20b for displaying a real-time input state of the sentence formed by the combination of words at an end of the sentence. Further, the second display window 122 may display a third cursor 20c which moves for correction of the sentence.

The third display window 123 may display a paragraph or paragraphs by combining sentences displayed on the second display window 122 over time. Here, the third display window 123 may display a result on which the correction of the sentence displayed on the second display window 122 is completed. Further, the third display window 123 may display the third cursor 20c on a completed sentence under the control of the controller 40 according to the input of the key input unit 12 so that the sentence may be corrected.

Meanwhile, as illustrated in FIG. 6, when foreign language speech is input from the speech input unit 11, the display unit 120 according to another embodiment of the present invention may phonetically display the foreign language speech under the control of the controller 40. When the third cursor 20c is moved to the phonetically displayed word by the key input unit 12, a selection window 124 for selecting at least one matched foreign language word from foreign language words stored in the storage 30 may be displayed on the first display window 121 or the second display window 122.

For example, as illustrated by a symbol c of FIG. 6, when the word "THAAD" is spoken to be input through speech input, "사드" is displayed on the second display window 122. When the third cursor 20c is moved to the word, the selection window 124 for selecting one of "THAAD" and "SOD" stored in the storage 30 may be displayed.

For example, as illustrated by a symbol c of FIG. 7, when the word "习主席'" is spoken to be input through speech input, "Xi" is displayed on the second display window 122. When the third cursor 20c is moved to the word, the selection window 124 for selecting one of "习主席'" and "'习近平" stored in the storage 30 may be displayed. Here, the words "习主席'" and "'习近平" are Chinese. Meanwhile, the embodiments disclosed in this specification are only examples to help understanding of the invention and the invention is not limited thereto. It should be clear to those skilled in the art that various modifications can be made on the basis of the technological scope of the invention in addition to the embodiments disclosed herein.

What is claimed is:

1. A speech recognition apparatus comprising:
a speech input unit configured to receive speech;
a key input unit configured to receive a signal for correcting a word or a sentence converted into text through the speech input from the speech input unit;
a display unit including a first display window and a second display window different from the first display window; and
a controller configured to convert the speech input from the speech input unit into text in units of words and allow the converted text to be displayed in real time on the first display window, and combine the words displayed on the first display window to generate a sentence and allow the generated sentence to be displayed in real time on the second display window,
wherein:
the controller allows a first cursor, which is displayed at an end of a word displayed in real time on the first display window and indicates an input state of the word, to be displayed on the first display window, allows a second cursor, which is displayed at an end of a combined sentence displayed in real time on the second display window and indicates an input state of the sentence, to be displayed on the second display window, and allows a third cursor for correction according to a signal of the key input unit to be moved and displayed on the first display window or the second display window; and
the controller displays as many special characters as the number of characters of a word that cannot be recognized among the words displayed on the first display window or the second display window to identify the number of characters.

2. The speech recognition apparatus claim 1, wherein the controller displays a word having a recognition rate lower than a preset value among the words displayed on the first display window or the second display window to identify the word.

3. The speech recognition apparatus claim 2, wherein the controller displays a value of the recognition rate of the word having the recognition rate lower than the preset value among the words displayed on the first display window or the second display window next to the word having the recognition rate lower than the preset value.

4. The speech recognition apparatus claim 3, wherein the value of the recognition rate refers to a value expressed from 0 to 1 according to the recognition rate.

5. The speech recognition apparatus claim 1, wherein the controller displays a word having a recognition rate lower than a preset value among words displayed on the first display window or the second display window in a different color or size.

6. The speech recognition apparatus claim 1, further comprising a storage configured to store foreign language words,
wherein, when foreign language speech is input from the speech input unit, the controller converts the foreign language speech into matched foreign language words among the foreign language words stored in the storage and displays the matched foreign language words on the first display window or the second display window.

7. The speech recognition apparatus claim 6, wherein, when the foreign language speech is input from the speech input unit, the controller phonetically displays the foreign language speech, and when the third cursor is moved to a phonetically displayed word by the key input unit, the controller provides a selection window for selecting at least one matched foreign language word from the foreign language words stored in the storage to the first display window or the second display window.

8. The speech recognition apparatus claim 1, wherein the controller combines words displayed on the first display window to generate a sentence, and displays the generated sentence on the second display window over time.

9. The speech recognition apparatus claim 1, wherein the controller displays a recognition rate of a sentence, which is displayed over time, on the second display window.

10. The speech recognition apparatus claim 1, wherein the display unit further includes a third display window configured to integrate and display sentences which are displayed on the second display window over time.

11. A speech recognition system comprising:
a content providing server configured to provide a content including speech; and
a speech recognition apparatus including a speech input unit configured to receive content from the content providing server and receive the speech included in the content, a key input unit configured to receive a signal for correcting a word or a sentence converted into text through the speech input from the speech input unit, a display unit including a first display window and a second display window different from the first display window, and a controller configured to convert the speech input from the speech input unit into text in units of words and allow the converted text to be displayed in real time on the first display window, and combine the words displayed on the first display window to generate a sentence and allow the generated sentence to be displayed in real time on the second display window,
wherein:
the controller allows a first cursor, which is displayed at an end of a word displayed in real time on the first display window and indicates an input state of the word, to be displayed on the first display window, allows a second cursor, which is displayed at an end of a combined sentence displayed in real time on the second display window and indicates an input state of the sentence, to be displayed on the second display window, and allows a third cursor for correction according to a signal of the key input unit to be moved and displayed on the first display window or the second display window; and
the controller displays as many special characters as the number of characters of a word that cannot be recognized among the words displayed on the first display window or the second display window to identify the number of characters.

* * * * *